US012381034B2

(12) United States Patent
Zhuang et al.

(10) Patent No.: US 12,381,034 B2
(45) Date of Patent: Aug. 5, 2025

(54) TRANSFORMER AND TRANSFORMER MACHINING PROCESS

(71) Applicant: Sungrow Power Supply Co., Ltd., Hefei (CN)

(72) Inventors: Jiacai Zhuang, Anhui (CN); Jun Xu, Anhui (CN); Wei Liu, Anhui (CN); Jinguo Su, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 974 days.

(21) Appl. No.: 17/601,920

(22) PCT Filed: May 29, 2020

(86) PCT No.: PCT/CN2020/093090

§ 371 (c)(1),
(2) Date: Oct. 6, 2021

(87) PCT Pub. No.: WO2021/098181

PCT Pub. Date: May 27, 2021

(65) Prior Publication Data

US 2022/0148797 A1 May 12, 2022

(30) Foreign Application Priority Data

Nov. 21, 2019 (CN) ......................... 201911149325.5

(51) Int. Cl.
*H01F 27/32* (2006.01)
*H01F 27/24* (2006.01)
(Continued)

(52) U.S. Cl.
CPC ........... *H01F 27/327* (2013.01); *H01F 27/24* (2013.01); *H01F 27/2876* (2013.01); *H01F 41/127* (2013.01)

(58) Field of Classification Search
CPC ....... H01F 27/327; H01F 27/24; H01F 41/127
See application file for complete search history.

(56) References Cited

U.S. PATENT DOCUMENTS 8,085,121 B2 * 12/2011 Hanov .................... H01F 27/36 336/84 C
11,972,893 B2 * 4/2024 Liang .................... H01F 41/127
(Continued)

FOREIGN PATENT DOCUMENTS

CN 1220039 A 6/1999
CN 1244288 A 2/2000
(Continued)

OTHER PUBLICATIONS

CN201911149325, Apr. 28, 2024, First Office Action.
(Continued)

*Primary Examiner* — Malcolm Barnes
(74) *Attorney, Agent, or Firm* — Wolf, Greenfield & Sacks, P.C.

(57) ABSTRACT

A transformer and a transformer machining process, including two coil units arranged side-by-side, each unit including an inner coil and an outer coil sleeved on the outside of the inner coil, an outer coil semi-conductive layer being wrapped on the outside of the outer coil and an inner coil semi-conductive layer being wrapped on the outside of the inner coil, and an insulating layer being integrally cast with the coil unit. In the transformer provided by the present application, the arrangement of the outer coil semi-conductive layer and the inner coil semi-conductive layer can effectively improve the problem of excessive local field strength caused by an irregular coil structure and solve the issue of wire package cracking caused by steel material generating heat in a pouring body; thus, the transformer has improved safety.

10 Claims, 11 Drawing Sheets

(51) Int. Cl.
*H01F 27/28* (2006.01)
*H01F 41/12* (2006.01)

(56) References Cited

U.S. PATENT DOCUMENTS

| | | | | |
|---|---|---|---|---|
| 2002/0046867 | A1* | 4/2002 | Leijon | H01F 27/34 174/110 R |
| 2002/0125785 | A1 | 9/2002 | Kylander et al. | |
| 2010/0109830 | A1 | 5/2010 | Hanser | |
| 2011/0146063 | A1* | 6/2011 | Park | H01F 27/363 29/605 |
| 2015/0109090 | A1* | 4/2015 | Patel | H01F 27/327 336/84 C |
| 2019/0371517 | A1* | 12/2019 | Donzel | H01F 27/28 |
| 2021/0027936 | A1* | 1/2021 | Tal | B60R 19/12 |

FOREIGN PATENT DOCUMENTS

| | | | | |
|---|---|---|---|---|
| CN | 1246980 | A | 3/2000 | |
| CN | 102203886 | A | 9/2011 | |
| CN | 108831721 | A | 11/2018 | |
| CN | 109524220 | A | 3/2019 | |
| CN | 110853898 | A | 2/2020 | |
| CN | 211376390 | U | 8/2020 | |
| DE | 102007006005 | B3 * | 7/2008 | H01F 27/288 |
| EP | 3 364 430 | A1 | 8/2018 | |
| JP | S40-009227 | Y | 3/1965 | |
| JP | S52-068918 | A | 6/1977 | |
| JP | H06-314626 | A | 11/1994 | |
| JP | H08-222453 | A | 8/1996 | |
| JP | 2005-032829 | A | 2/2005 | |
| KR | 10-2010-0112772 | A | 10/2010 | |
| KR | 20100112772 | A * | 10/2010 | |
| WO | 98/34248 | A1 | 8/1998 | |

OTHER PUBLICATIONS

First Office Action for Chinese Application No. 201911149325, dated Apr. 28, 2024.

Extended European Search Report for European Application No. 20890627.1, dated Dec. 16, 2022.

EP20890627.1. Dec. 16, 2022, Extended European Search Report.

Office Action for Japanese Application No. 2021-559672, mailed Oct. 18, 2022.

International Search Report and Written Opinion for International Application No. PCT/CN2020/093090, mailed Sep. 3, 2020.

* cited by examiner

TRANSFORMER AND TRANSFORMER MACHINING PROCESS

This application is the national stage filing under 35 U.S.C. § of International Patent Application Serial No. PCT/CN2020/093090, filed on May 29, 2020, which claims priority to Chinese Patent Application No. 201911149325.5, titled "TRANSFORMER AND TRANSFORMER MACHINING PROCESS", filed with the China National Intellectual Property Administration on Nov. 21, 2019. The contents of these applications are incorporated herein by reference in their entirety.

FIELD

The present disclosure relates to the technical field of electric equipment processing, and in particular to an epoxy-cast transformer and a transformer machining process.

BACKGROUND

In an existing power distribution network, high-voltage electricity is provided to various loads after being stepped down by a power distribution transformer, which is a very important part of the power distribution network. Conventional power distribution transformer has many disadvantages, such as large size, heavy weight, large no-load loss, inability to automatically isolate faults, and output susceptible to interference from the power grid, etc.

In a process of transformer machining, an iron core, a winding, and an insulating pad all need to be built into a casting material. Due to a large difference in thermal expansion coefficients of various materials, the casting material may crack due to thermal shock during an application process, which further leads to insulation failure. Moreover, the iron core generally has a rigid structure, which is difficult to solidify reliably with the casting material, and may also cause the casting material to crack in the application.

Moreover, in the transformer, in order to ensure that a primary side and a secondary side can bear high voltage, field strength in the air must be less than a breakdown voltage of the transformer, which further leads to a larger distance between the primary and secondary sides, which affects a power density of the system to a certain extent. Excessive distance between the primary and secondary sides will cause excessive magnetic leakage, which increases the loss. An irregular coil structure will cause excessive local field strength, resulting in lower application safety of the transformer.

Therefore, how to improve the application safety of the transformer is a technical issue to be solved urgently by those skilled in the art.

SUMMARY

An object of the present disclosure is to provide a transformer with improved application safety. Another object of the present disclosure is to provide a transformer machining process.

In order to achieve the above objects, a transformer is provided according to the present disclosure, which includes two coil units arranged side by side. Each of the two coil units includes an inner coil and an outer coil sleeved outside the inner coil. The outer coil is wrapped with an outer coil semi-conductive layer, and the inner coil is wrapped with an inner coil semi-conductive layer. Each of the two coil units is integrally cast with an insulating layer.

Preferably, an outer surface semi-conductive layer is laid on the outside of the insulating layer; an end of the outer surface semi-conductive layer is pre-embedded inside the insulating layer, and is provided with an equipotential body located inside the insulating layer.

Preferably, the equipotential body is a bell mouth structure or a circular curvature structure.

Preferably, the transformer further includes an iron core; the inner coil semi-conductive layer and the iron core are spaced to form an air flow channel.

Preferably, the transformer further includes an equipotential cavity fixedly connected to the insulating layer; an inner surface semi-conductive layer is provided inside the equipotential cavity.

Preferably, the equipotential cavity and the insulating layer are integrally formed.

Preferably, the transformer is a solid-state transformer.

Preferably, the insulating layer includes a first insulating layer cast inside the inner coil semi-conductive layer, a second insulating layer cast inside the outer coil semi-conductive layer, and a third insulating layer cast on an outer surface of the inner coil semi-conductive layer and an outer surface of the outer coil semi-conductive layer.

Preferably, the insulating layer is a casting structure formed integrally.

A transformer machining process includes the following steps:

A1: wrapping an inner coil semi-conductive layer outside an inner coil;

A2: wrapping an outer coil semi-conductive layer outside an outer coil, and sleeving the outer coil outside the inner coil semi-conductive layer to form a coil unit;

A3: arranging two coil units side by side, and casting an insulating medium on the two coil units to form an insulating layer; and A4: installing an iron core onto the two coil units, and spacing the iron core apart from the inner coil semi-conductive layer to form an air flow channel.

Preferably, the step A3 includes:

A31: casting a first insulating medium at a position of the inner coil wrapped with the inner coil semi-conductive layer; and casting a second insulating medium at a position of the outer coil wrapped with the outer coil semi-conductive layer; and A32: casting a third insulating medium on an outer surface of the inner coil semi-conductive layer and an outer surface of the outer coil semi-conductive layer, wherein the first insulating medium, the second insulating medium and the third insulating medium form the insulating layer.

In the above technical solution, the transformer provided by the present disclosure includes two coil units arranged side by side. Each of the two coil units includes an inner coil and an outer coil sleeved outside the inner coil. The outer coil is wrapped with an outer coil semi-conductive layer, and the inner coil is wrapped with an inner coil semi-conductive layer. Each of the two coil units is integrally cast with an insulating layer.

It can be seen from the above description that, in the transformer provided by the present disclosure, by providing the outer coil semi-conductive layer and the inner coil semi-conductive layer, a problem of excessive local field strength caused by an irregular coil structure can be effectively solved. Therefore, the safety of the transformer provided by the present disclosure is improved.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be obtained based on the provided drawings without any creative efforts.

Figure 1:
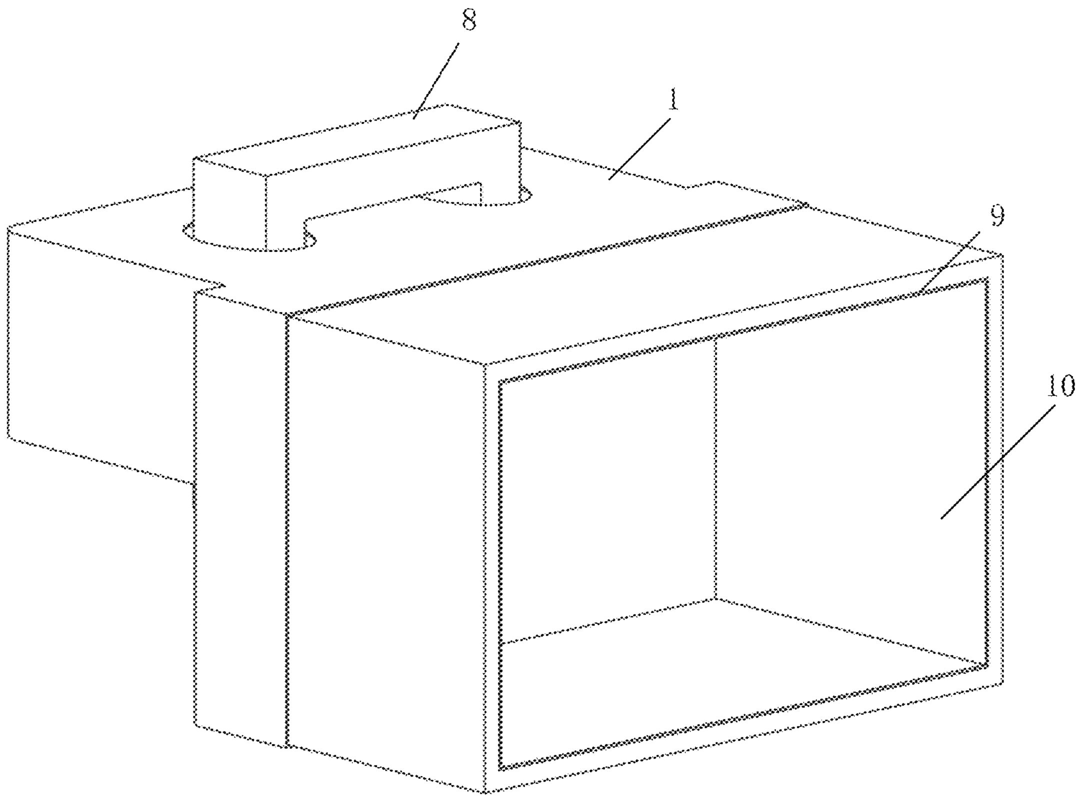
FIG. 1 is a schematic structural view of a transformer provided by an embodiment of the present disclosure.

| Reference numerals in FIGS. 1 to 13 are listed as follows: | |
|---|---|
| 1 outer surface semi-conductive layer, | 2 insulating layer, |
| 3 outer coil semi-conductive layer, | 4 outer coil, |
| 5 inner coil semi-conductive layer, | 6 inner coil, |
| 7 air flow channel, | 8 iron core, |
| 9 inner surface semi-conductive layer, | 10 equipotential cavity, |
| 11 equipotential body. | |

DETAILED DESCRIPTION OF THE EMBODIMENTS

A core of the present disclosure is to provide a transformer with improved application safety. Another core of the present disclosure is to provide a transformer machining process.

In order to enable those skilled in the art to better understand the technical solutions of the present disclosure, the present disclosure will be further described in detail below with reference to the accompanying drawings and embodiments.

Reference is made to FIGS. 1 to 13.

In a specific embodiment, the transformer provided by the specific embodiment of the present disclosure includes an iron core 8 and two coil units arranged side by side. Each of the two coil units includes an inner coil 6 and an outer coil 4 sleeved outside the inner coil 6. The outer coil 4 is wrapped with an outer coil semi-conductive layer 3. The inner coil 6 is wrapped with an inner coil semi-conductive layer 5, which can effectively solve the problem of excessive local field strength caused by the irregular structure of the inner coil 6. Preferably, one side of the outer semi-conductive layer 3 is tangent to an outer surface of an insulating layer 2 to facilitate positioning and fixing of workpieces during an overall casting process.

Each of the two coil units is integrally cast with the insulating layer 2. High electric field strength of the transformer is coupled in the cast insulating layer 2. Specifically, the insulating layer 2 is an integral casting structure, that is, the inner coil, the outer coil, the outer coil semi-conductive layer 3 and the inner coil semi-conductive layer 5 are insulation cast at the same time.

The insulating layer 2 includes a first insulating layer cast inside the inner coil semi-conductive layer 5, a second insulating layer cast inside the outer coil semi-conductive layer 3, and a third insulating layer cast on an outer surface of the inner coil semi-conductive layer 5 and an outer surface of the outer coil semi-conductive layer 3. That is, a wire package of the inner coil, a wire package of the outer coil and an external insulation structure are respectively cast. Preferably, the materials of the first insulating layer, the second insulating layer and the third insulating layer are the same.

Since a semi-conductive material has desirable wettability with an insulation casting material of the insulating layer, the field strength can be concentrated inside the insulating layer 2. The breakdown field strength of a general casting material is greater than 20 kV/mm, which can effectively reduce a distance between the primary and secondary sides, improve the power density and reduce the magnetic leakage.

Specifically, the transformer provided in the present disclosure may specifically be a solid-state transformer.

Figure 3:
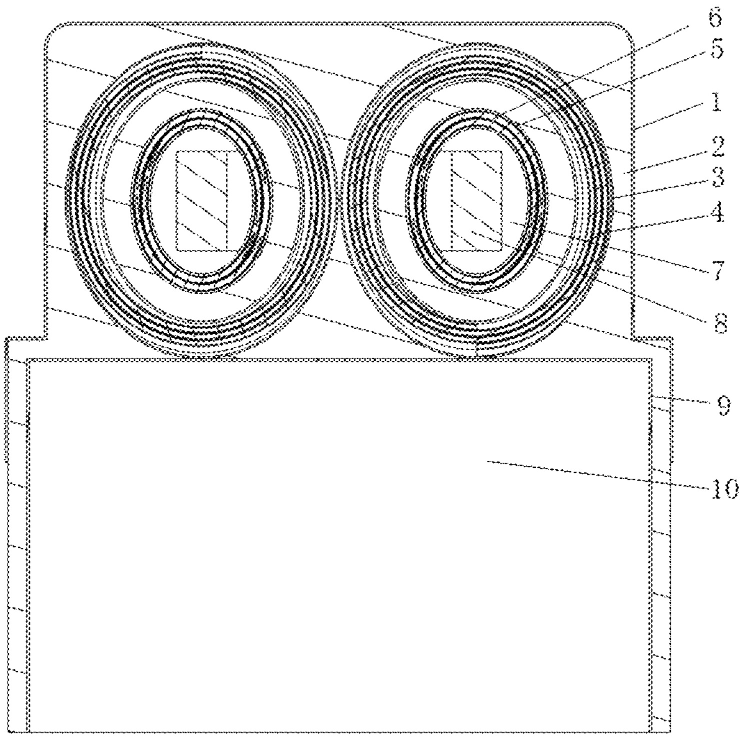
FIG. 3 is a top view of the transformer shown in FIG. 2.
Figure 4:
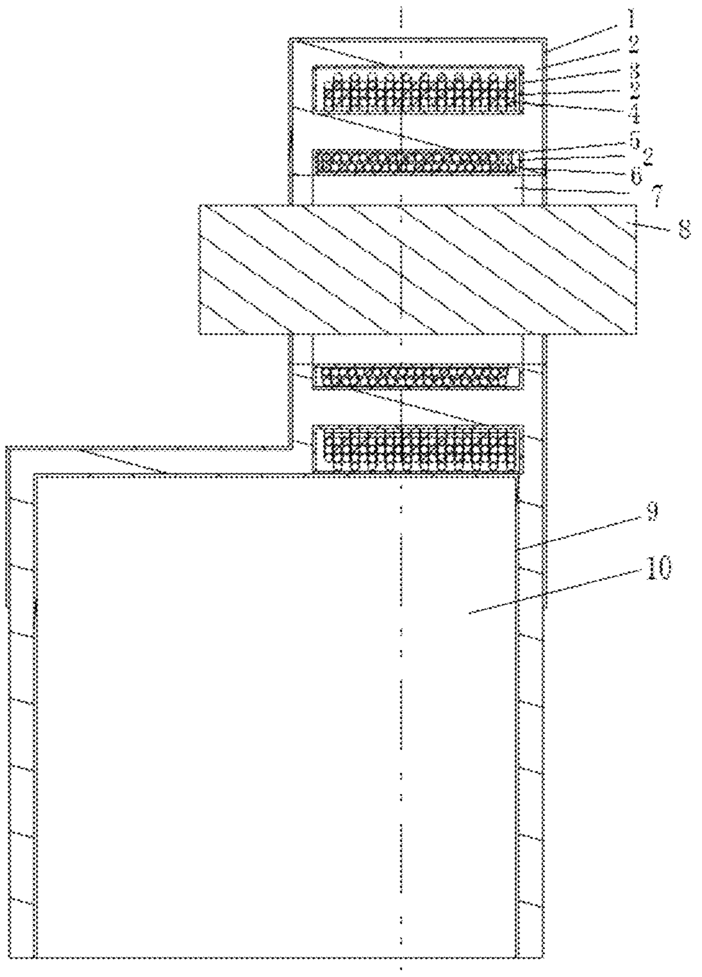
FIG. 4 is a side view of the transformer shown in FIG. 2.
Figure 5:
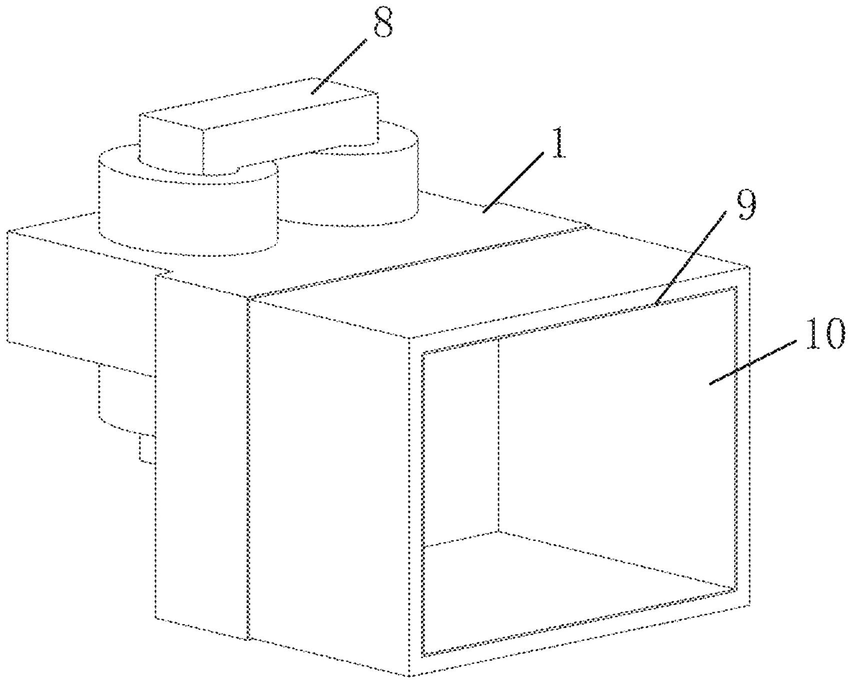
FIG. 5 is a schematic structural view of another transformer provided by an embodiment of the present disclosure.
Figure 6:
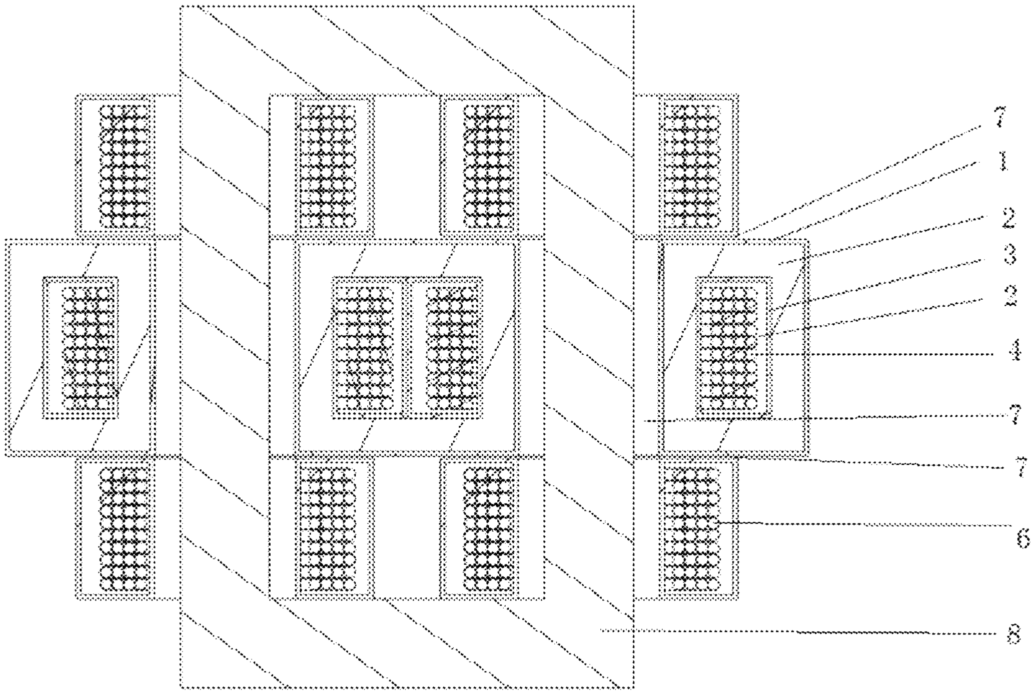
FIG. 6 is a front view of the transformer shown in FIG. 5.
Figure 7:
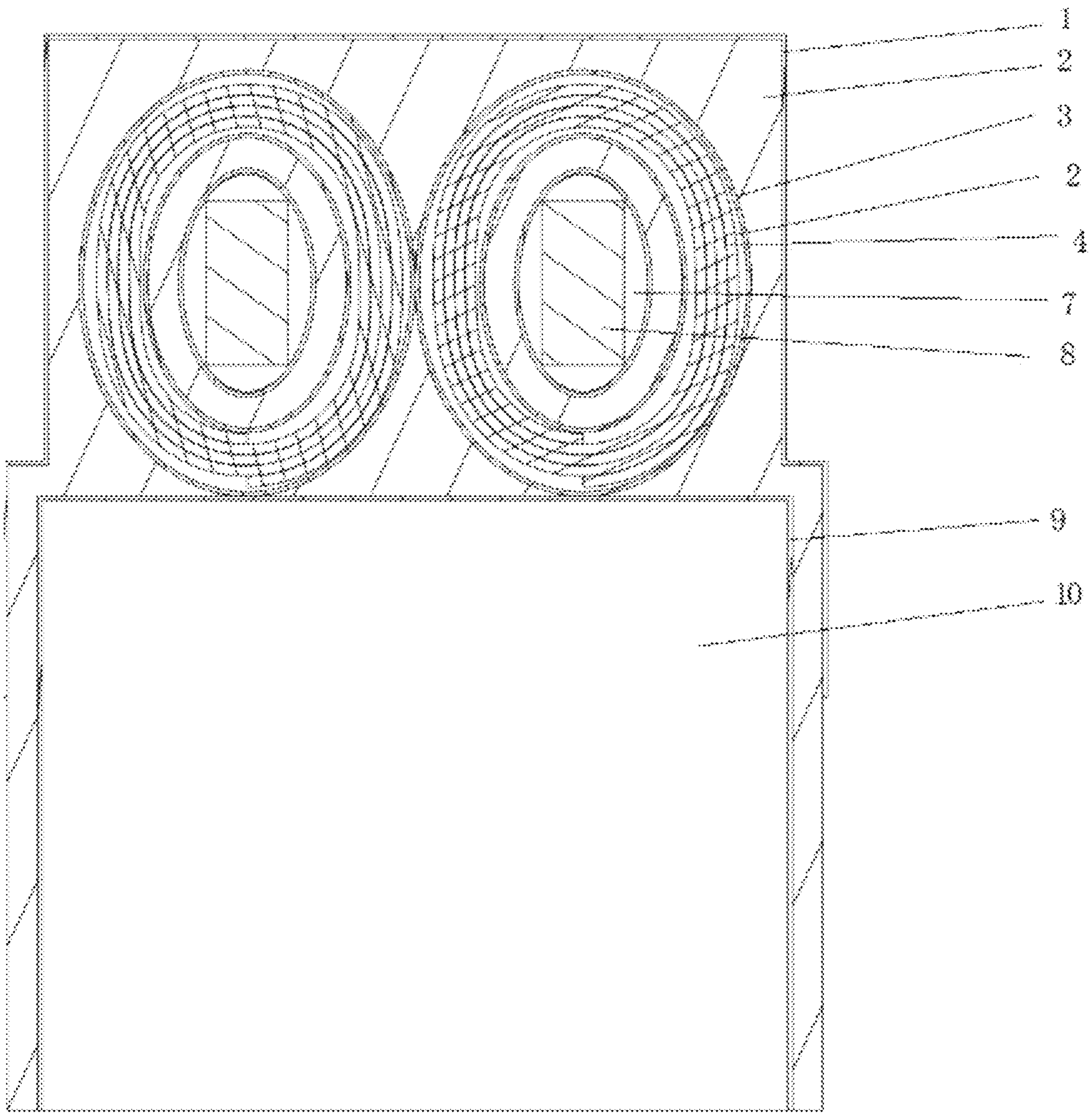
FIG. 7 is a top view of the transformer shown in FIG. 6.
Figure 8:
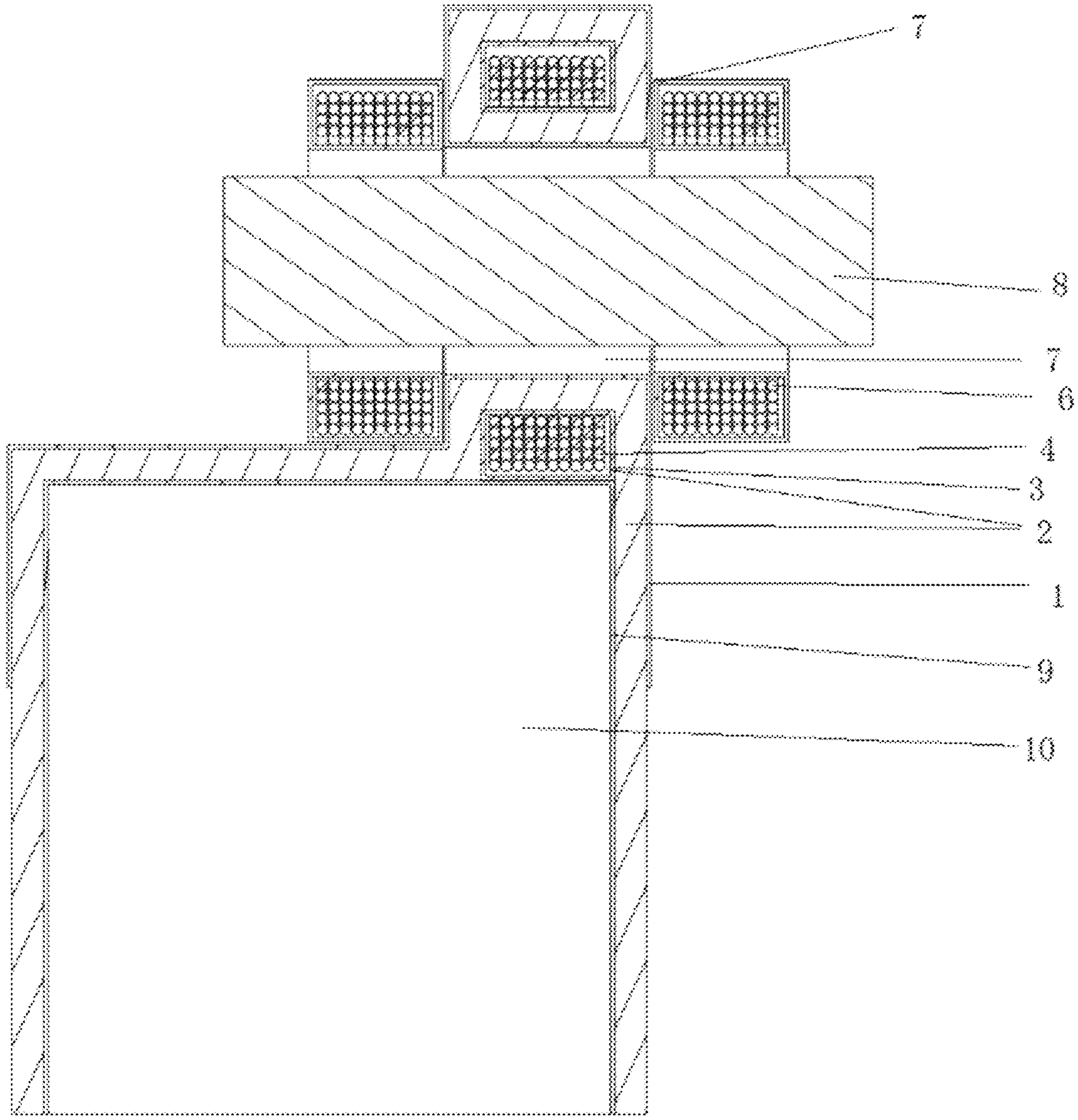
FIG. 8 is a side view of the transformer shown in FIG. 6.
Figure 9:
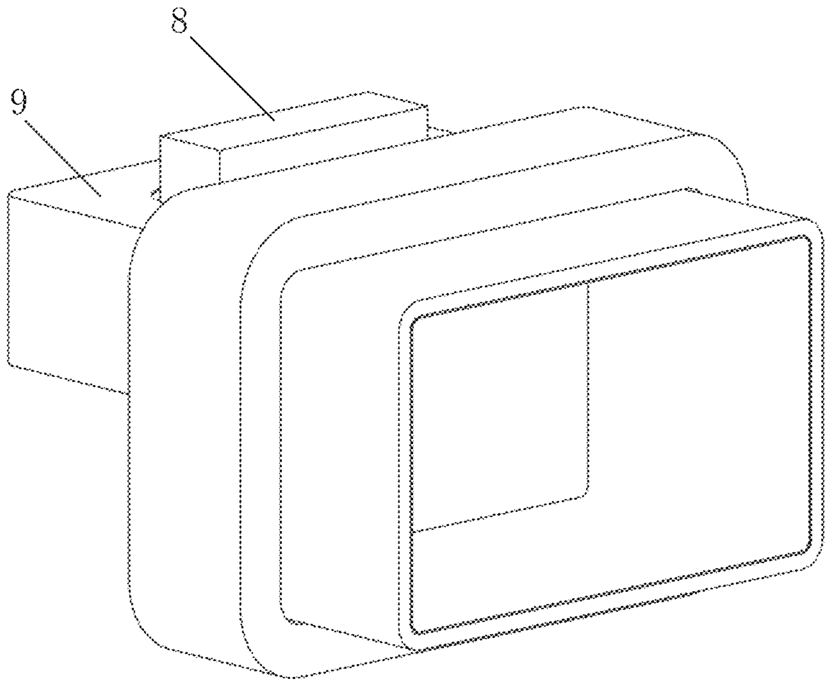
FIG. 9 is a schematic structural view of yet another transformer provided by an embodiment of the present disclosure.
Figure 10:
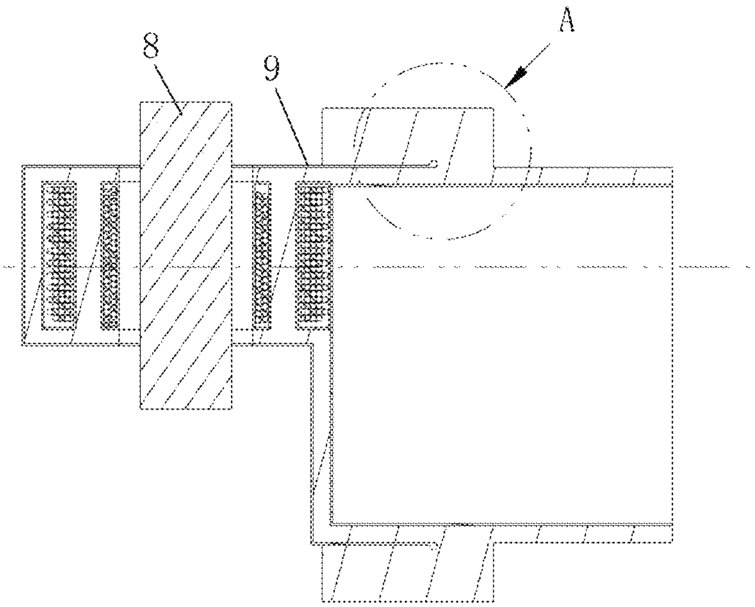
FIG. 10 is a front view of the transformer shown in FIG. 9.
Figure 11:
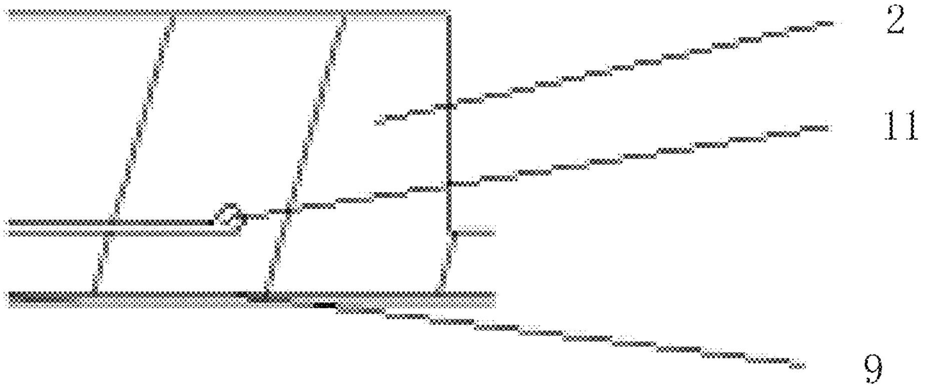
FIG. 11 is an enlarged view of part A shown in FIG. 10.
Figure 12:
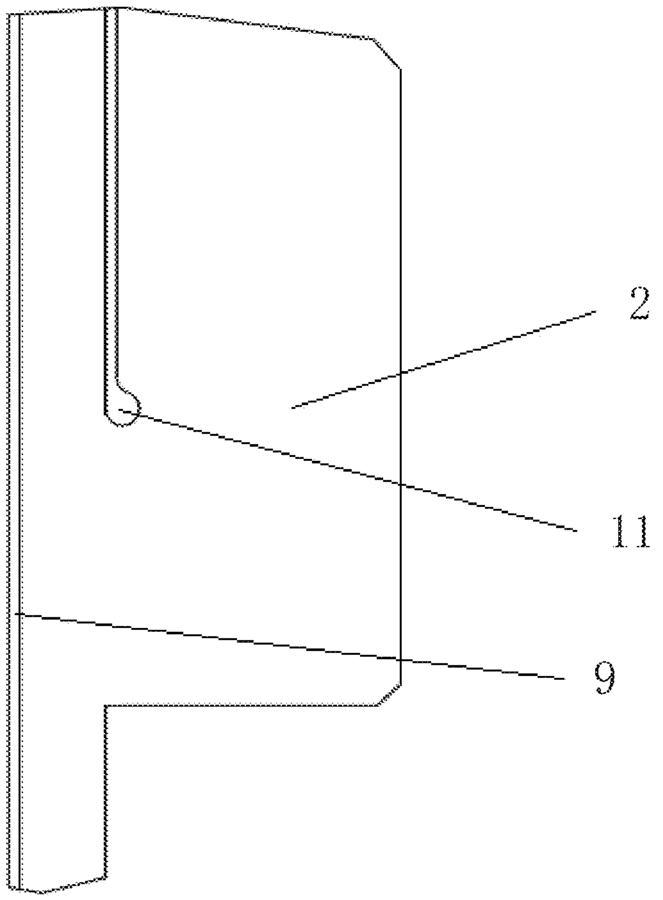
FIG. 12 is a view showing an installation position of an equipotential body provided by an embodiment of the present disclosure.
Figure 13:
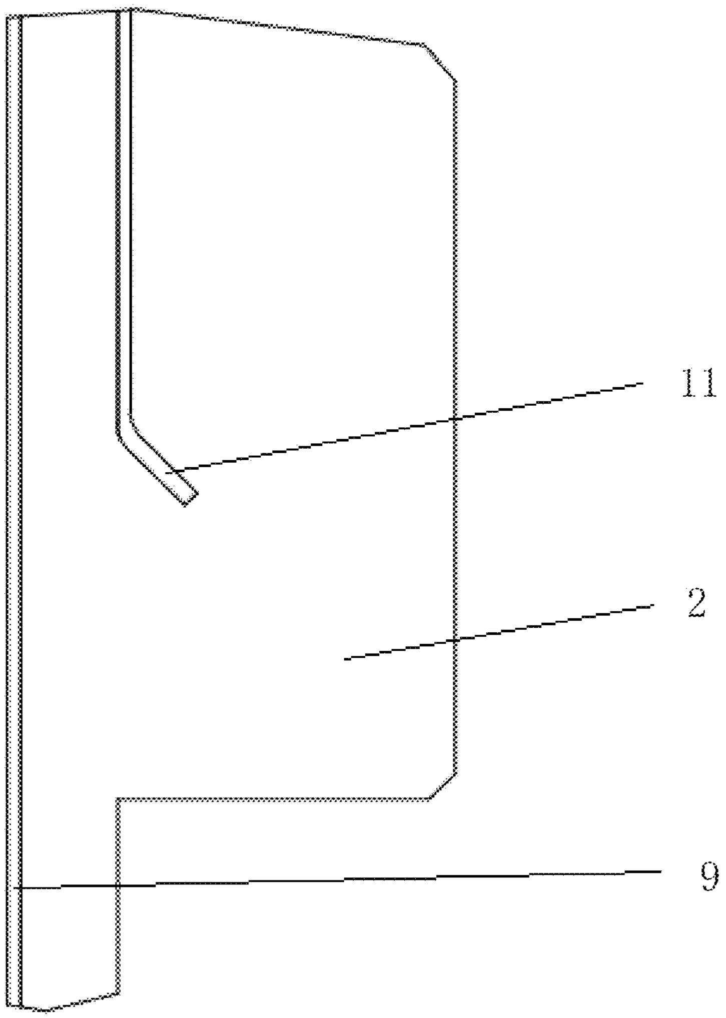
FIG. 13 is a view showing the mounting position of another equipotential body provided by an embodiment of the present disclosure.

Specifically, as shown in FIG. 3 and FIG. 4, the outer coil 4 may be sleeved outside the inner coil 6. In another way, as shown in FIG. 5 to FIG. 8, the inner coil 6 and the outer coil 4 may arranged as an up and down structure, and the inner coil 6 and the outer coil 4 of the upper and down structure may be cast integrally or separately. The illustrated embodiment is an example of separate casting.

In a specific embodiment, two outer coil semi-conductive layers 3 are arranged side by side, as shown in FIG. 3, to facilitate positioning and fixing of workpieces during an overall casting process.

Figure 2:
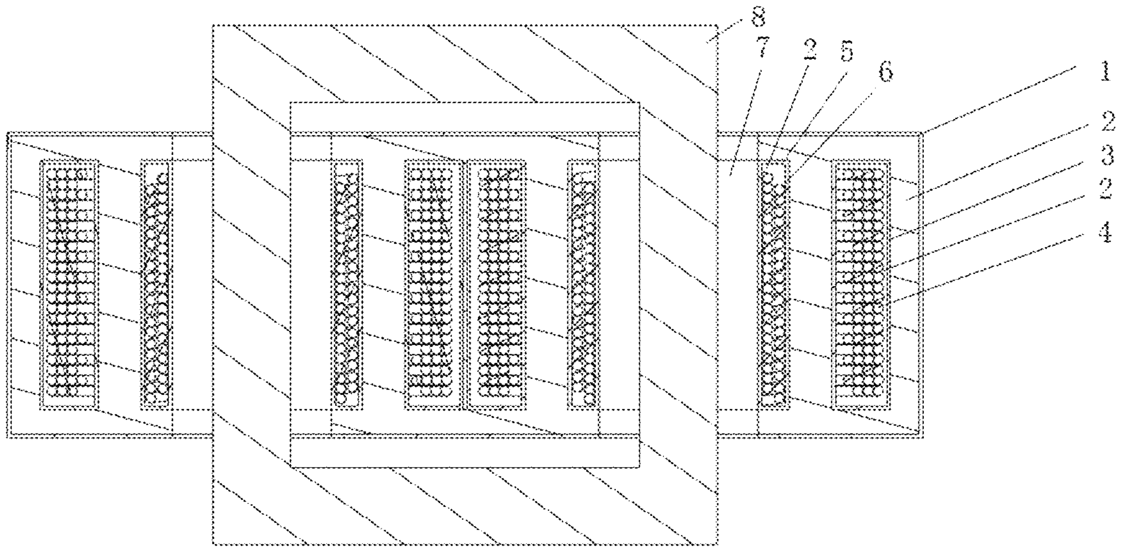
FIG. 2 is a front view of the transformer shown in FIG. 1.

Specifically, as shown in FIG. 2, a side of the inner coil semi-conductive layer 5, close to the outer coil 4, and the upper and lower ends of the inner coil semi-conductive layer 5 are all cast with the insulating layer 2. In a specific embodiment, an outer surface semi-conductive layer 1 is laid on the outside of the insulating layer 2.

The inner coil 6, the inner coil semi-conductive layer 5, the outer coil 4 and the outer coil semi-conductive layer 3 are integrally cast to form a whole, and the integral casting material fills the periphery of these materials. The integrally cast insulating layer 2 may be formed by casting for one time or multiple times. The inner coil semi-conductive layer 5 and the outer surface semi-conductive layer 1 can be reliably connected to an integrally cast coil by means of spray coating, impregnation, pre-embedding, integrally casting, etc.

Specifically, the iron core 8 is installed after the inner coil 6 and the outer coil 4 have been manufactured.

Preferably, winding units are made of a relatively soft material. Specifically, the inner coil semi-conductive layer 5 and the outer coil semi-conductive layer 3 may be semi-conductive tape made of high polymer materials, and the inner coil 6 and the outer coil 4 may be copper wires or the like which have desirable wettability with the casting material, and will not cause excessive mechanical stress concentration due to thermal expansion during the heating process. Cracking of the product is further avoided. A problem of cracking caused by excessive mechanical stress in the application process of conventional product, which is cast directly, is better solved.

It can be seen from the above description that, in the transformer provided by the specific embodiment of the present disclosure, the coil and the semi-conductive material are integrally cast, and the iron core 8 is installed onto the insulating layer 2, which solves the problem of wire package cracking caused by the heating of the rigid material in a casting body. The windings are cast integrally, which has a relatively small mechanical stress, and the anti-cracking performance is greatly improved. Therefore, the safety of the transformer provided by the present disclosure is improved.

In a specific embodiment, an end of the outer surface semi-conductive layer 1 is pre-embedded inside the insulating layer 2, and is provided with an equipotential body 11 located inside the insulating layer 2. An end structure of the semi-conductive layer is pre-embedded to improve the distribution of electric field intensity at the end. The integrally cast wire package and transformer structure with an end grounding cut-off point structure, specifically, the equipotential body 11 is a bell mouth structure or a circular curvature structure to avoid local field strength concentration.

In a specific embodiment, the inner coil semi-conductive layer 5 and the iron core 8 are spaced to form an air flow channel 7. The air flow channel 7 around the iron core 8 passes through the inside of the transformer, which can better dissipate heat from the whole of the coil units and the iron core 8. Moreover, due to the presence of the inner coil semi-conductive layer 5, this part of the air flow channel 7 does not bear high field strength.

On the basis of the above solutions, preferably, the transformer further includes an equipotential cavity 10 fixedly connected to the insulating layer 2. Preferably, the equipotential cavity 10 and the insulating layer 2 are formed integrally, and the equipotential cavity 10 and the insulating layer 2 are integrally cast. A structure of the equipotential cavity 10 is integrally formed. An inner surface semi-conductive layer 9 is provided inside the equipotential cavity 10. By providing the equipotential cavity 10, the space utilization rate is effectively improved, and the power density is improved. By providing the equipotential cavity 10, requirement of the conventional transformer adopts high-voltage lead-out terminal to achieve the insulation distance is changed. No other objects are allowed to be placed in the space. However, with the present solution, related electronic components on the same side may be placed inside the equipotential cavity 10, so as to avoid the insulation failure of the device due to excessive field strength.

In a specific embodiment, the iron core 8, the gap 7, the inner coil 6, the inner coil semi-conductive layer 5, and the outer surface semi-conductive layer 1 are located on one side of the insulating layer 2; and the outer coil 4, the outer coil semi-conductive layer 3, the inner surface semi-conductive layer 9 and the equipotential cavity 10 are on another side of the insulating layer 2.

A transformer machining process is provided according to the present disclosure, which includes the following steps:

A1: wrapping an inner coil semi-conductive layer 5 outside an inner coil 6;

A2: wrapping an outer coil semi-conductive layer 3 outside an outer coil 4, and sleeving the outer coil 4 outside the inner coil semi-conductive layer 5 to form a coil unit;

By providing the outer coil semi-conductive layer 3 and the inner coil semi-conductive layer 5, the problem of local excessive field strength caused by irregular coil structure is effectively solved, and the problem of wire package cracking caused by the heating of the rigid material in a casting body is solved. The safety of the transformer is improved.

A3: arranging two coil units side by side, and casting an insulating medium on the two coil units to form an insulating layer 2. The insulating medium is uniformly cast on the inner coil 6, the outer coil 4, the outer coil semi-conductive layer 3 and the inner coil semi-conductive layer 5.

Specifically, the step A3 includes:

A31: casting a first insulating medium at a position of the inner coil 6 wrapped with the inner coil semi-conductive layer 5; and casting a second insulating medium at a position of the outer coil 4 wrapped with the outer coil semi-conductive layer 3. That is, the inner coil 6 and the outer coil 4 are separately cast.

A32: casting a third insulating medium on an outer surface of the inner coil semi-conductive layer 5 and an outer surface of the outer coil semi-conductive layer 3, wherein the first insulating medium, the second insulating medium and the third insulating medium form the insulating layer. Preferably, the first insulating medium, the second insulating medium and the third insulating medium are the same insulating medium.

Preferably, one side of the outer semi-conductive layer 3 is tangent to an outer surface of an insulating layer 2 to facilitate positioning and fixing of workpieces during an overall casting process.

A4: installing an iron core 8 onto the two coil units, and spacing the iron core 8 apart from the inner coil semi-conductive layer 5 to form an air flow channel 7. The air flow channel 7 around the iron core 8 passes through the inside of the transformer, which can better dissipate heat from the whole of the coil units and the iron core 8. Moreover, due to the presence of the inner coil semi-conductive layer 5, this part of the air flow channel 7 does not bear high field strength.

In a specific embodiment, an outer surface semi-conductive layer 1 is laid on the outside of the insulating layer 2. In a specific embodiment, an end of the outer surface semi-conductive layer 1 is pre-embedded inside the insulating layer 2, and is provided with an equipotential body 11 located inside the insulating layer 2. An end structure of the semi-conductive layer is pre-embedded to improve the distribution of electric field intensity at the end. The integrally cast wire package and transformer structure with an end grounding cut-off point structure, specifically, the equipotential body 11 is a bell mouth structure or a circular curvature structure to avoid local field strength concentration.

On the basis of the above solutions, preferably, the transformer further includes an equipotential cavity 10 fixedly connected to the insulating layer 2. Preferably, the equipotential cavity 10 and the insulating layer 2 are formed integrally, and the equipotential cavity 10 and the insulating layer 2 are integrally cast. A structure of the equipotential cavity 10 is integrally formed. An inner surface semi-conductive layer 9 is provided inside the equipotential cavity 10. By providing the equipotential cavity 10, the space utilization rate is effectively improved, and the power density is improved. By providing the equipotential cavity 10, requirement of the conventional transformer adopts high-voltage lead-out terminal to achieve the insulation distance is changed. No other objects are allowed to be placed in the space. However, with the present solution, related electronic components on the same side may be placed inside the equipotential cavity 10, so as to avoid the insulation failure of the device due to excessive field strength.

In a specific embodiment, the iron core 8, the gap 7, the inner coil 6, the inner coil semi-conductive layer 5, and the outer surface semi-conductive layer 1 are located on one side of the insulating layer 2; and the outer coil 4, the outer coil semi-conductive layer 3, the inner surface semi-conductive layer 9 and the equipotential cavity 10 are on another side of the insulating layer 2.

Preferably, winding units are made of a relatively soft material. Specifically, the inner coil semi-conductive layer 5 and the outer coil semi-conductive layer 3 may be semi-conductive tape made of high polymer materials, and the inner coil 6 and the outer coil 4 may be copper wires or the like which have desirable wettability with the casting material, and will not cause excessive mechanical stress concentration due to thermal expansion during the heating process. Cracking of the product is further avoided. A problem of cracking caused by excessive mechanical stress in the application process of conventional product, which is cast directly, is better solved.

The embodiments of the present disclosure are described in a progressive manner, with an emphasis placed on explaining the difference between each embodiment and other embodiments. The same or similar parts among the embodiments can be referred to each other.

Based on the above description of the disclosed embodiments, those skilled in the art can implement or deploy the present application. Various modifications to these embodiments are obvious to a person skilled in the art, the general principle defined herein may be implemented in other embodiments without departing from the spirit and scope of the present application. Hence, the present application is not limited to the embodiments disclosed herein, but is to conform to the widest scope in accordance with the principle and novel features disclosed herein.

The invention claimed is:

1. A transformer, comprising two coil units arranged side by side, wherein each of the two coil units comprises an inner coil and an outer coil sleeved outside the inner coil, the outer coil is wrapped with an outer coil semi-conductive layer, the inner coil is wrapped with an inner coil semi-conductive layer, and each of the two coil units is integrally cast with an insulating layer; and wherein the transformer further comprises an iron core, wherein the inner coil semi-conductive layer and the iron core are spaced to form an air flow channel.

2. The transformer according to claim 1, wherein an outer surface semi-conductive layer is laid on an outside of the insulating layer; an end of the outer surface semi-conductive layer is pre-embedded inside the insulating layer, and is provided with an equipotential body located inside the insulating layer.

3. The transformer according to claim 2, wherein the equipotential body is a bell mouth structure or a circular curvature structure.

4. The transformer according to claim 2, wherein the insulating layer comprises a first insulating layer cast inside the inner coil semi-conductive layer, a second insulating layer cast inside the outer coil semi-conductive layer, and a third insulating layer cast on an outer surface of the inner coil semi-conductive layer and an outer surface of the outer coil semi-conductive layer.

5. The transformer according to claim 1, further comprising an equipotential cavity fixedly connected to the insulating layer, wherein an inner surface semi-conductive layer is provided inside the equipotential cavity.

6. The transformer according to claim 5, wherein the equipotential cavity and the insulating layer are integrally formed.

7. The transformer according to claim 1, wherein the transformer is a solid-state transformer.

8. The transformer according to claim 1, wherein the insulating layer is a casting structure formed integrally.

9. A transformer machining process, comprising the following steps:

A1: wrapping an inner coil semi-conductive layer outside an inner coil;

A2: wrapping an outer coil semi-conductive layer outside an outer coil, and sleeving the outer coil outside the inner coil semi-conductive layer to form a coil unit;

A3: arranging two coil units side by side, and casting an insulating medium on the two coil units to form an insulating layer; and A4: installing an iron core onto the two coil units, and spacing the iron core apart from the inner coil semi-conductive layer to form an air flow channel.

10. The transformer machining process according to claim 9, wherein the step A3 comprises:

A31: casting a first insulating medium at a position of the inner coil wrapped with the inner coil semi-conductive layer; and casting a second insulating medium at a position of the outer coil wrapped with the outer coil semi-conductive layer; and A32: casting a third insulating medium on an outer surface of the inner coil semi-conductive layer and an outer surface of the outer coil semi-conductive layer, wherein the first insulating medium, the second insulating medium and the third insulating medium form the insulating layer.

* * * * *